United States Patent [19]

Liu

[11] Patent Number: 4,721,407
[45] Date of Patent: Jan. 26, 1988

[54] JOINT FOR A BICYCLE FRAME

[76] Inventor: King Liu, No. 19, Shun Fan Road, Ta Chia Town, Taichung Hsien, Taiwan

[21] Appl. No.: 888,346

[22] Filed: Jul. 23, 1986

[51] Int. Cl.$^4$ .............................................. F16B 1/00
[52] U.S. Cl. .................... 403/205; 403/267; 403/198
[58] Field of Search ............... 403/389, 394, 396, 398, 403/186, 192, 230, 232.1, 234, 235, 361, 171, 265, 267, 198; 285/331; 182/228

[56] References Cited

U.S. PATENT DOCUMENTS

| 548,306 | 10/1895 | Eller | 403/192 |
| 574,734 | 1/1897 | Ide | 403/192 |
| 932,546 | 8/1909 | Hedstrom | 403/186 X |
| 2,111,642 | 3/1938 | Saier | 403/361 X |
| 2,580,118 | 12/1951 | Mercier | 403/389 X |
| 4,190,479 | 2/1980 | Smith | 285/331 X |
| 4,256,333 | 3/1981 | Jones | 285/331 X |
| 4,433,931 | 2/1984 | Malish et al. | 403/361 X |
| 4,489,659 | 12/1984 | Kamohara et al. | 403/205 X |

Primary Examiner—Andrew V. Kundrat
Attorney, Agent, or Firm—Birch, Stewart, Kolasch, Birch

[57] ABSTRACT

An improved joint for a bicycle frame has a first sleeve for receiving a head tube and a second sleeve projecting laterally from the first sleeve, for receiving a top tube or a downtube, wherein the second sleeve includes an inner tube and an outer tube, which coaxially project from the first sleeve and which are spaced from each other with a circumferential clearance which is slightly larger than the thickness of the top tube or the downtube so that the top tube or downtube may be snap fit into this clearance.

2 Claims, 5 Drawing Figures

JOINT FOR A BICYCLE FRAME

BACKGROUND OF THE INVENTION

The invention relates to a bicycle frame, particularly to an improved joint for a bicycle frame.

Generally, a conventional bicycle frame, as shown in FIG. 1, includes a head tube 1, a seat tube 2 for supporting a seat (not shown), two seat stays 3 connected to the upper portion of the seat tube 2, two chain stays 3' connecting the lower portion of the seat tube 2 to the rear portion of the seat stays 3, a top tube 4 connecting the head tube 1 to the upper portion of the seat tube 2, and a downtube 4' connecting the head tube 1 to the lower portion of the seat tube 2. In the conventional frame, the head tube 1 is connected to the top tube 4 and to the downtube 4' by two respective joints 5, as shown in FIG. 2. Each joint 5 includes a first sleeve 5A for sleeving a head tube 1 and a second sleeve 5B projecting laterally from the first sleeve 5A, for sleeving a top tube 4 or a downtube 4'. After the head tube 1 is inserted into the first sleeve 5A, and after the top tube 4 or the downtube 4' is inserted into the second sleeve 5B, the engaging area between the tube 1, 4, 4' and the sleeve 5A, 5B must be welded, using a copper solder or a spelter solder. This requisite welding connection causes several drawbacks. Firstly, it is necessary for the person skilled in welding technique to ensure the proper positioning 4 the components of the frame after welding. Secondly, welding increases manufacturing costs. Also, since it is desired that bicycles be as lightweight as possible, a light solid material such as aluminium alloy is used in fabrication. This material, however, may be difficult to apply by a welder.

SUMMARY OF THE INVENTION

An object of the invention is to provide a firm joint for a bicycle frame which not only can be made of a light, solid material, but which is also quickly manufactured, convenient and stable.

According to the invention, an improved joint for a bicycle frame includes a first sleeve for recieving a head tube and a second sleeve projecting laterally from said first sleeve, for recieving a top tube or a downtube, characterized in that said second sleeve includes an outer tube and an inner tube, which coaxially project from said first sleeve and which are spaced from each other with a circumferential clearance which is slightly larger than the thickness of said top tube or said downtube so that said top tube or said downtube may be snap fit in said clearance.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
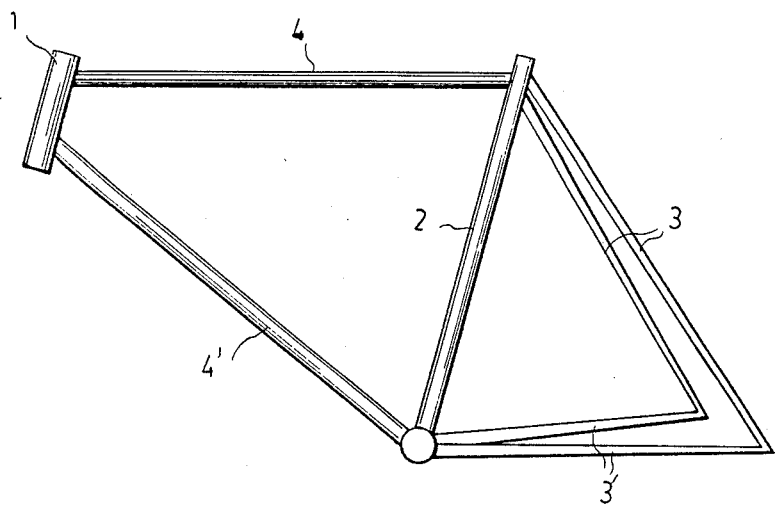
FIG. 1 is a schematic view of a known bicycle frame.
Figure 2:
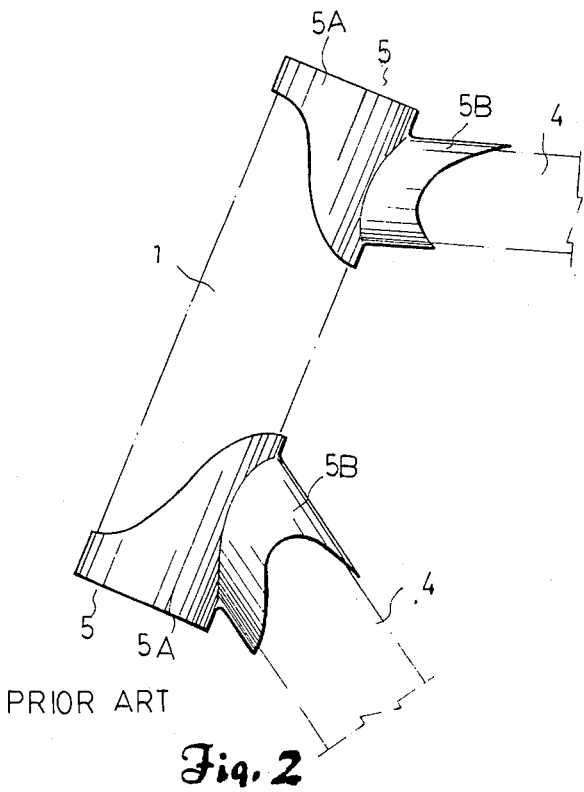
FIG. 2 is a schematic view showing two joints for a bicycle frame according to prior art.
Figure 3:
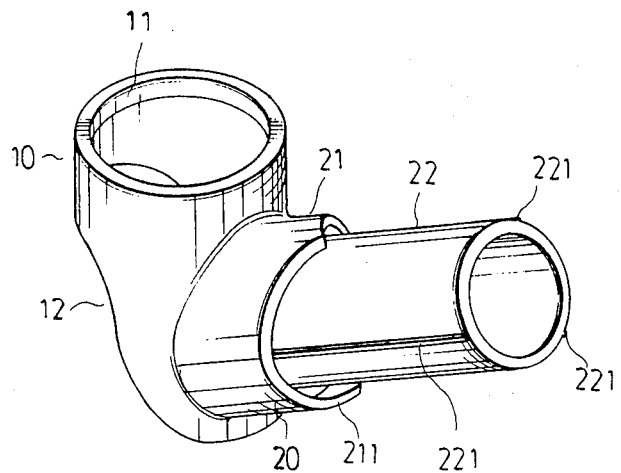
FIG. 3 is a perspective view showing an improved joint for a bicycle frame according to the invention.
Figure 4:
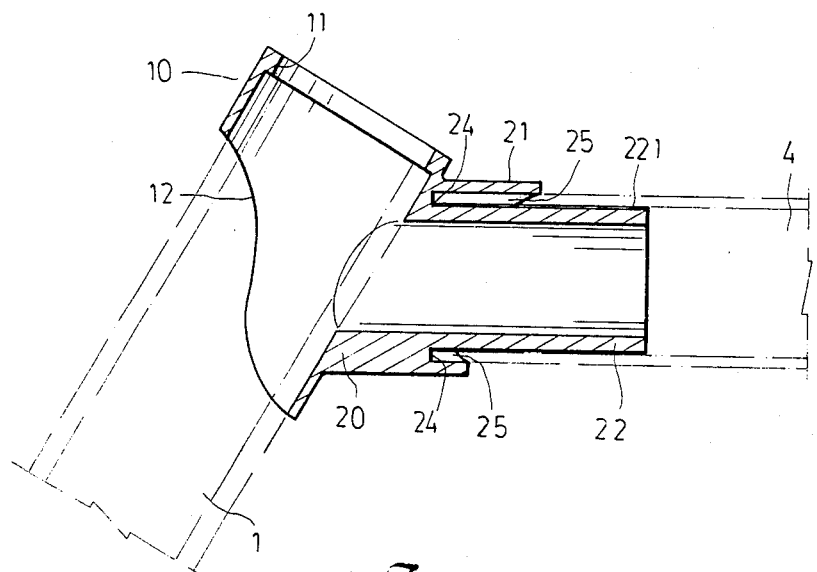
FIG. 4 is a sectional view of an improved joint for a bicycle frame according to the invention, showing a head tube and a top tube or a downtube in broken line.

Referring to FIGS. 3 and 4, an improved joint according to the invention includes a first sleeve 10 including an inward flange 11 for restricting passage of a top of a head tube 1, and a lower opening 12 indented in an irregular curved shape for to reducing the amount of sleeve material required. A second sleeve 20 is provided. This second sleeve 20 includes an outer tube 21 an an inner tube 22, which coaxially project laterally from the first sleeve 10. The outer tube 21 is shorter than the inner tube 22, and the two tubes 21, 22 are connected by a radial wall 24 at a base portion thereof and are spaced from each other by a circumferential clearance 25. This clearance 25 is slightly larger than a thickness of a top tube or a downtube 4 so that the top tube or downtube 4 may be snap fit in the clearance 25. The outer tube 21 includes an irregular shaped opening 211 and the inner tube 22 includes three axially extending elongated protusions 221 on the outer surface of the inner tube 22. This arrangement enhances snap fitting of the top tube or the downtube 4 with the second sleeve 20. Optionally, the engaging area of the first sleeve 10 and the head tube 1 as well as the engaging area of the second sleeve 20 and the top tube or the downtube 4 may be applied with an adhesive to enhance the security of the snap fitting. The thickness of the adhesive layer on the engaging area is decided by the thickness of the protrusions 221 for the purpose of ensuring the stability of the joint of the second sleeve 20 and the top tube or the downtube 4. Thus, the security of the joint according to the invention is the same as other prior art joints (such as that of FIG. 2). However, the joint of the instant invention is quicker and easier to assemble as it is easier to position the elements thereof. Furthermore, no welding is required by the joint of the present invention.

Figure 5:
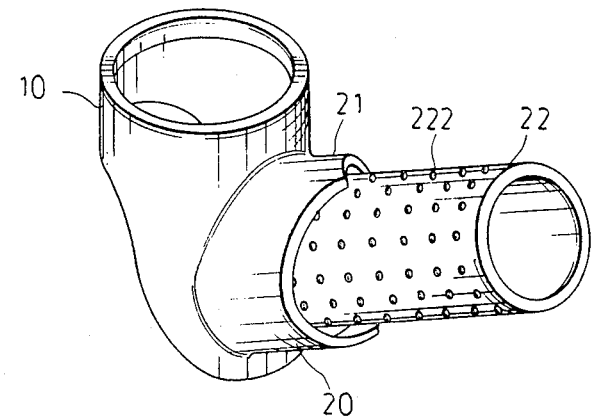
FIG. 5 is a perspective view showing another improved joint for a bicycle frame according to the invention.

Referring to FIG. 5, the structure of another improved joint according to the invention is disclosed. This joint is similar to the joint of FIGS. 3 and 4 except for a plurality of bumps 222 on the outer surface of the inner tube 22. The bumps 222 are adapted for frictional engagement of a top tube or a downtube.

Aternatively, the lower opening 12 may be in any suitable form, such as a circular shape parallel to the upper opening of the first sleeve 10 so as to increase the engagement area of the head tube 1 with the first sleeve 10. The openings of the outer tube 21 and the inner tube 22 may also be in any suitable form. For example, the outer tube 21 may be elongated relative to the inner tube 22, and the protrusions 221 and the bumps 222 may be provided on the inner surface of the outer tube 21.

With the foregoing, the splitting of usual single-tube sleeves applied by an adhesive in other fields can be avoided, when an external force is applied thereon.

With the invention thus explained, it is apparent that various modifications and variations can be made without departing from the scope of the invention, it is therefore intended that the invention be limited as indicated in he appended claims.

What is claimed is:

1. A joint for a bicycle frame including a head tube, a top tube and a down tube, said top tube and said down tube each having a certain diameter, said joint comprising:

a first sleeve for receiving said head tube;

a second sleeve projecting laterally from said first sleeve, said second sleeve receiving at least one of said top tube and said down tube, said second sleeve comprising;

an inner tube having a diameter slightly less than the diameter of at least one of said top tube and said down tube, said inner tube having an outer surface with means controlling the thickness of an adhesive formed thereon; and an outer tube surrounding said inner tube, said outer tube having a diameter slightly greater than the diameter of at least one of said top tube and said down tube, said outer tube having an inner surface with an adhesive layer formed thereon, said inner tube and said outer tube being coaxially aligned and integrally formed with said first sleeve, said inner tube and said outer tube having a circumferential clearance thereinbetween, said circumferential clearance receiving an end of said at least one of said top tube and down tube, and said adhesive surfaces of both said inner tube and said outer tube bonding with the end of said at least one of said top tube and down tube inserted in the circumferential clearance to form a bond between said second sleeve and said at least one of said top tube and down tube.

2. The joint for a bicycle frame as recited in claim 1, wherein said inner tube of said second sleeve has a plurality of projections axially extending along the outer surface, said projections being raised from the outer surface of said inner tube and enabling an increase in thickness of said adhesive layer in order to increase strength of adhesion in the joint.

* * * * *